United States Patent [19]
Snead et al.

[11] 3,869,542
[45] Mar. 4, 1975

[54] METHOD FOR PRODUCING POTASSIUM AZIDE

[75] Inventors: William K. Snead, Wheeling; Robert E. McGreevy, New Martinsville, both of W. Va.

[73] Assignee: PPG Industries, Inc., Pittsburgh, Pa.

[22] Filed: Aug. 5, 1970

[21] Appl. No.: 61,275

Related U.S. Application Data

[63] Continuation-in-part of Ser. No. 810,980, March 27, 1969, Pat. No. 3,803,296.

[52] U.S. Cl. .............................................. 423/410
[51] Int. Cl. ............................................ C01b 21/08
[58] Field of Search ............... 23/101, 191; 423/410

[56] References Cited
UNITED STATES PATENTS
3,455,648  7/1969  Shaw et al. .......................... 23/101

OTHER PUBLICATIONS

Mellor's Inorganic and Theoretical Chemistry, Vol. VIII, Supplement II, Nitrogen, (Part II), pp. 16–18, (Wiley 1967).

*Primary Examiner*—G. O. Peters
*Attorney, Agent, or Firm*—George D. Morris

[57] ABSTRACT

Potassium azide is produced by precipitation from a solution of sodium azide and tripotassium orthophosphate. By conducting precipitations of potassium azide and by-product trisodium orthophosphate at two different temperatures, a cyclic process may be achieved.

27 Claims, 1 Drawing Figure

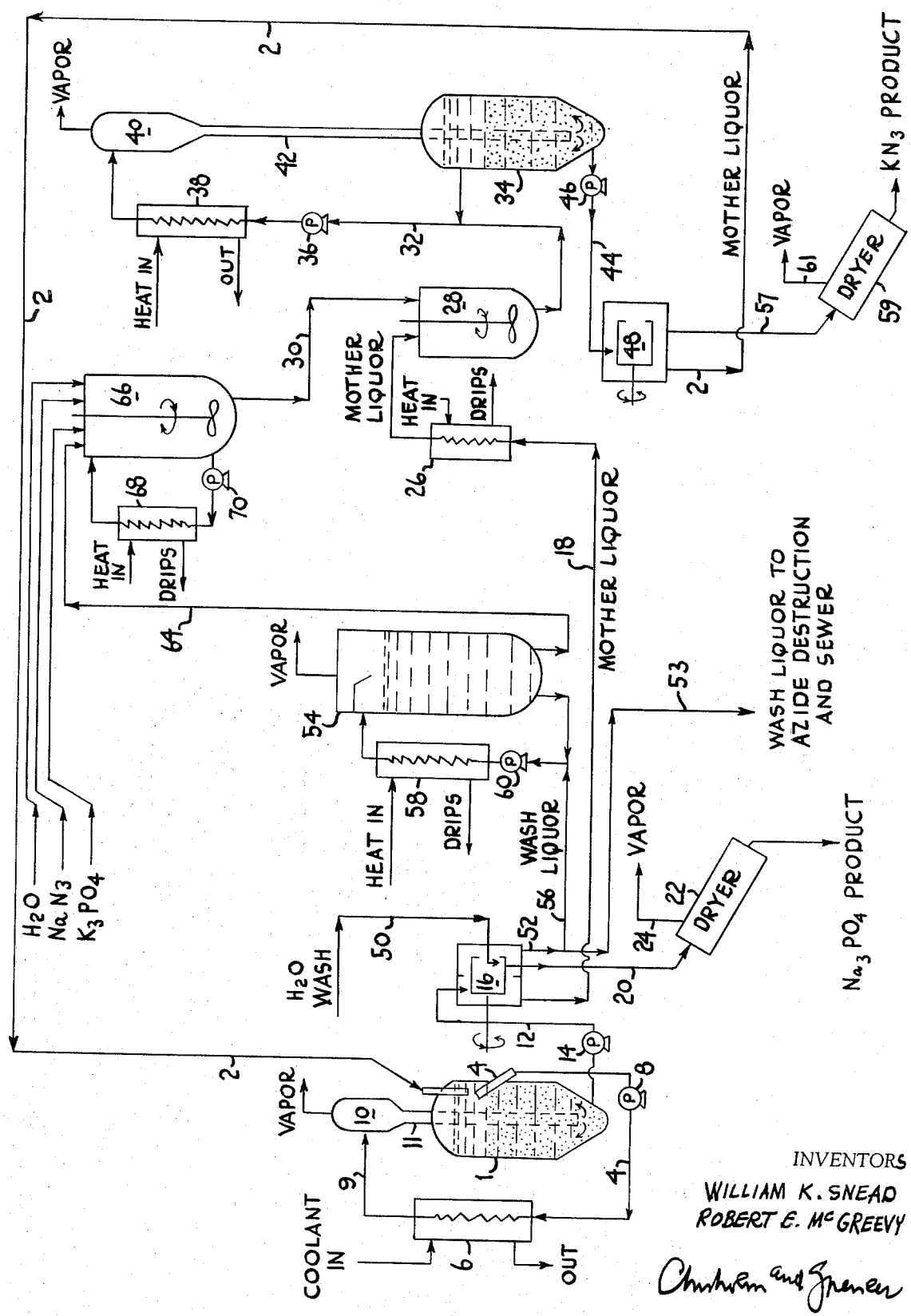

3,869,542

METHOD FOR PRODUCING POTASSIUM AZIDE

RELATED APPLICATIONS

This application is a continuation-in-part of application Ser. No. 810,980, filed Mar. 27, 1969, now U.S. Pat. No. 3,803,296.

U.S. application Ser. No. 810,980, filed Mar. 27, 1969, discusses in detail the production of potassium azide from sodium azide and potassium carbonate. Phase diagrams are given for the system there under consideration and instruction is provided for use of the phase diagrams. Similar systems using other salts in lieu of potassium carbonate are possible, but the effectiveness of these other salts must be determined empirically since there is no effective method for extrapolating from one salt to another.

It has now been found that potassium azide may be produced from sodium azide and tripotassium orthophosphate by double replacement. An additional feature of this invention allows potassium azide to be produced in a cyclic process.

Potassium azide may be produced by precipitating the same from a solution containing significant quantities of sodium azide and tripotassium orthophosphate. A quantity is significant in this respect when each of the two enumerated salts is present at a concentration of at least 2 per cent by weight of the total anhydrous salts comprising the solution. Thus, each of these salts is present in solution in more than mere trace or contaminating amounts. Usually the solution contains each salt in an amount which is at least 10 per cent by weight of the total anhydrous salts comprising the solution. Such solutions may be formed from sodium azide, tripotassium orthophosphate and water. Potassium azide is then precipitated from the solution and separated from the bulk of the resulting mother liquor. Precipitation may be accomplished by the evaporation of water. The ease of evaporation may be increased by the application of a vacuum. The temperature of the evaporation may range from very slightly above the freezing point to the boiling point of the solution. The freezing point of the solution is that point at which the system comprises only the solid phase. The evaporation is preferably, but not necessarily, conducted substantially isothermally. Separation of the solid from the bulk of the mother liquor resulting from the precipitation of potassium azide may be affected by filtration or centrifugation.

If after precipitation and separation of the potassium azide the separated first mother liquor is cooled, a by-product sodium phosphate, believed to be trisodium orthophosphate, is precipitated. Further precipitation of sodium phosphate may be achieved by the evaporation of water. This evaporation may be conducted at any temperature ranging from the freezing point of the solution to the boiling point of the solution under the prevailing conditions of pressure. Usually the evaporation is effected at a temperature ranging from the temperature to which the separated first mother liquor is cooled to the temperature at which potassium azide is precipitated. This water removal is preferably, but not necessarily, conducted isothermally and may be assisted by operating at reduced pressure. Usually it is convenient to evaporate water at the temperature to which the first mother liquor is cooled. It is also convenient to evaporate water during the cooling of the separated first mother liquor.

The precipitated sodiium phosphate may be separated from the bulk of the mother liquor resulting from this precipitation, hereinafter called the "second mother liquor." Filtration or centrifugation is suitable for effecting the separation. By combining the separated second mother liquor with additional quantities of sodium azide, tripotassium orthophosphate and water, and by bringing the temperature of the system to the temperature of the first precipitation where potassium azide was produced, a cyclic process is achieved. Solid feed materials may be added directly to the second mother liquor or a feed solution of sodium azide and tripotassium orthophosphate may be used. The feed solution may be saturated with respect to one or both of the feed salts, but it is preferred that it be slightly unsaturated in order to insure complete dissolution of the salts and to avoid undesirable precipitations due to minor short-term temperature fluctuations.

The crystals from either the potassium azide precipitation or the sodium phosphate precipitation or both of these precipitations may be washed to remove entrained mother liquor, if desired, and dried. Spent wash liquor resulting from either or both of these washings may be sent to azide destruction and disposaal, but it is preferably forwarded to an evaporator where its salt concentration is increased by removing of a portion of the water. This concentrated solution is then added to the second mother liquor. The evaporator may be eliminated from the wash water recycle system, if desired, provided that the amount of water used to wash the potassium azide crystals does not exceed the water removed from other regions of the system.

By properly regulating the concentrations of the slutions in acordance with the phase equilibria of the system and by regulating the water balance of the system, a continuous process for the production of potassium azide is provided.

It will be apparent that the cyclic process as a whole or any of its individual steps maay be operated either continuously or intermittently. The FIGURE illustrates a continuous process which may be used in acccordance with this invention. A solution containing dissolved sodium azide and dissolved tripotassium orthophosphate is introduced into cooling ccrystallizer 1 through lilne 2. Mother liquor and the feed solution are circulated through line 4 and heat exchanger 6 by pump 8. Coolant is circulated through the heat exchanger to cool the circulating mother liquor and feed solution to about 25°C. The mixture of mother liquor and feed solution, which mixture is supersaturated with respect to sodium phosphate, is introduced to a bed of crystals through line 9, vapor head 10, and leg 11. A vacuum may be applied to the vapor head if vapor is to be removed. Magma is withdrawn from the crystallizer through line 12 by pump 14. The magma is introduced to a centrifuge 16 where mother liquor is removed through line 18. The azide remaining with the crystals is removed by wash water introduced through line 50. Azide containing wash liquor is removed through line 52. This wash liquor may be sent to azide destruction and disposal through line 53, but it is preferably forwarded to evaporator 54 through line 56. Sodium phosphate crystals are then removed from centrifuge 16 through line 20 and sent to dryer 22 where water vapor is removed through line 24. Mother liquor is introduced to heat exchanger 26 where it is heated to about 75°C. The warm mother liquor then proceeds to mix tank 28 where it is combined with an aqueous solution of sodium azide and tripotassium orthophosphate which is introduced to mix tank 28 through line 30. The solution is withdrawn from mix tank 28, fed through line 32, and combined with the circulating mother liquor in evaporator-crystallizer 34. Circulation is provided by the pump 36. The circulating liquid is heated in heat exchanger 38 so the vapor will flash off in vapor head 40. A vacuum may be applied to the vapor head or not, as desired. The supersaturated solution is passed throuogh leg 42 and introduced into a bed of potassium azide crystals where potassium azide precipitates. Magma is withdrawn from evaporator-crystallizer 34 through line 44 by pump 46 and introduced to centrifuge 48. Mother liquor is removed from centrifuge 48 through line 2 and returned to cooling crystallizer 1. The crystals may be washed, if desired; but this is not ordinarily necessary where the potassium azide is to be used for agricultural purposes. The crystals are removed from centrifuge 48 through line 57 and sent to dryer 59 where water vapor is removed through line 61. The wash liquor from centrifuge 16 fed to evaporator 54 is mixed with circulating liquor circulated through heat exchanger 58 by pump 60. Vapor is flashed from the superheated liquid in evaporator 54. Concentrated solution containing azide and phosphate values is then fed through line 64 to dissolver 66 where it is mixed with sodium azide and tripotassium orthophosphate. These solids arae dissolved preferably by agitation while the solvent is circulated through heat exchanger 68 by pump 70. Solution at 75°C. is removed from the dissolver 66 and introduced through line 30 to mix tank 28. The evaporator may be eliminated, if desired, provided that the amount of water used to wash the potassium azide crystals does not exceed the water removed from other regions of the system. Should the system require make-up water, it may conveniently be added to dissolver 66.

The feed salts have been discussed with reference to the anhydrous salts, but it is often convenient to add hydrated salts. Similarly, hydrated salts sometimes precitate. The principles governing systems dealing with hydrated salts are the same as those for anhydrous salts, except that the water of hydration must be accounted for in the water balance.

The precise temperature and permissible concentrations of salts in solution which yield particular salts upon precipitation are dependent upon the phase equilibria of the system. Determination of the solubility data maay be accomplished by known procedures such as that described in Purdon and Slater, *Aqueous Solution and the Phase Diagram*, Edward Arnold & Co., London (1946). Once the phase equilibria are known, phase diagrams may be plotted therefrom. The accuracy of the phase diagrams is dependent upon the number of data points determined. By increasing the number of data points, the accuracy of the phase diagrams or any part thereof may be made to approach that of the experimental and analytical procedures employed.

The following specific embodiment illustrates, by way of example, the basic principles of the present invention.

EXAMPLE

Water in the amount of about 167.082 grams is evaporated at 75°C. from an aqueous solution initially containing about 48.76 grams of dissolved sodium azide, about 60 grams of dissolved tripotassium orthophosphate and about 225 grams of water to precipitate 13.078 grams of solid material which is removed by filtration. The resulting 153.6 grams of mother liquor is cooled to 25°C. to precipitate crystals after which 111.6 grams of water is added to mobilize the crystals. After a period of shaking at 25°C., 16.815 grams of crystals is removed by filtration. The analysis of the crystals precipitated at 75°C. is as follows:

ANALYSIS, Equivalents

| $K^+$ | $Na^+$ | $N_3^-$ | $PO_4^{---}$ |
|---|---|---|---|
| 0.1172 | 0.0432 | 0.1197 | 0.0283 |

We claim:
1. A method for producing potassium azide comprising:
   a. removing water at a first temperature from an aqueous solution containing at least 2 per cent by weight of the total anhydrous salts present therein, each of the following salts: sodium azide and tripotassium orthophosphate to precipitate potassium azide and to form a first mother liquor;
   b. separating said precipitated potassium azide from the bulk of said first mother liquor;
   c. decreasing the temperature of said separated first mother liquor to a temperature which is lower than said first temperature to precipitate a sodium phosphate and form a second mother liquor; and
   d. separating said precipitated sodium phosphate from the bulk of said second mother liquor.

2. The method of claim 1 wherein said aqueous solution is formed from sodium azide, tripotassium orthophosphate, water, and second mother liquor.

3. The method of claim 2 wherein the quantity of water added to form said aqueous solution is at least as great as the quantity of water removed from the system during the precipitations of potassium azide and sodium phosphate.

4. The method of claim 1 wherein water is removed from said separated first mother liquor to precipitate an additional quantity of said sodium phosphate.

5. The method of claim 4 wherein the removal of said water from said separated first mother liquor is accomplished while said separated first mother liquor is cooled from said first temperature to said second temperature.

6. The method of claim 1 wherein said first temperature is about 75°C.

7. The method of claim 1 wherein said second temperature is about 25°C.

8. The method of claim 1 wherein said separated sodium phosphate is washed to substantially remove entrained mother liquor.

9. The method of claim 8 wherein at least a portion of the spent wash liquor resulting from said washing is combined with separated second mother liquor.

10. The method of claim 9 wherein the salt concentration of the spent wash liquor is increased prior to combining said spent wash liquor with separated second mother liquor.

11. The method of claim 10 wherein said concentration of salt in said spent wash liquor is accomplished by removing water from said spent wash liquor.

12. The method of claim 1 wherein said separated potassium azide is washed to substantially remove entrained mother liquor.

13. The method of claim 12 wherein at least a portion of the spent wash liquor resulting from said washing is combined with separate second mother liquor.

14. The method of claim 13 wherein the salt concentration of the spent wash liquor is increased prior to combining said spent wash liquor with separated second mother liquor.

15. The method of claim 14 wherein said concentration of salt in said spent wash liquor is accomplished by removing water from said spent wash liquor.

16. The method of claim 1 wherein said aqueous solution contains said sodium azide and said tripotassium orthophosphate each in an amount which is at least 10 per cent by weight of the total anhydrous salts comprising said aqueous solution.

17. A cyclic process for producing potassium azide comprising:
   a. removing water at a first temperature from an aqueous solution which is obtained from step $e$ and which contains sodium azide and tripotassium orthophosphate each in an amount which is at least 2 per cent by weight of the total anhydrous salts comprising said aqueous solution, to precipitate potassium azide and to form a first mother liquor;
   b. separating said precipitated potassium azide from the bulk of said first mother liquor;
   c. decreasing the temperature of said separated first mother liquor to a temperature which is lower than said first temperature to precipitate a sodium phosphate and to form a second mother liquor;
   d. separating said precipitated sodium phosphate from the bulk of said second mother liquor; and
   e. adding heat and combining sodium azide, tripotassium orthophosphate, water, and said separated second mother liquor to form said aqueous solution at said first temperature.

18. The cyclic process of claim 17 wherein said aqueousu solution contains sodium azide and tripotassium orthophosphate each in an amount which is at least 10 per cent by weight of the total anhydrous salts comprising said aqueous solution.

19. The cyclic process of claim 17 wherein the quantity of water added to form said aqueous solution is at least as great as the quantity of water removed from the system during the precipitations of potassium azide and sodium phosphate.

20. The cyclic process of claim 17 wherein water is removed from said separated first mother liquor to precipitate an additional quantity of said sodium phosphate.

21. The cyclic process of claim 20 wherein the removal of said water from said separated first mother liquor is accomplished while said separated first mother liquor is cooled from said first temperature to said second temperature.

22. The cyclic process of claim 17 wherein said first temperature is about 75°C.

23. The cyclic process of claim 17 wherein said second temperature is about 25°C.

24. The cyclic process of claim 17 wherein said separated sodium phosphate is washed to substantially remove entrained mother liquor.

25. The cyclic process of claim 24 wherein at least a portion of the spent wash liquor resulting from said washing is combined with separated second mother liquor.

26. The cyclic process of claim 25 wherein the salt concentration of the spent wash liquor is increased prior to combining said spent wash liquor with separated second mother liquor.

27. The cyclic process of claim 26 wherein said concentration of salt in said spent wash liquor is accomplished by removing water from said spent wash liquor.

* * * * *